US006778392B2

(12) United States Patent
Chiou

(10) Patent No.: US 6,778,392 B2
(45) Date of Patent: Aug. 17, 2004

(54) HEAT DISSIPATION DEVICE FOR ELECTRONIC COMPONENT

(75) Inventor: Ing-Jer Chiou, Taipei (TW)

(73) Assignee: Arima Computer Corporation, Taipei (TW)

(*) Notice: Subject to any disclaimer, the term of this patent is extended or adjusted under 35 U.S.C. 154(b) by 0 days.

(21) Appl. No.: 10/342,775

(22) Filed: Jan. 15, 2003

(65) Prior Publication Data

US 2004/0114328 A1 Jun. 17, 2004

(30) Foreign Application Priority Data

Dec. 13, 2002 (TW) ........................................ 91136207 A

(51) Int. Cl.[7] .................................................. H05K 7/20
(52) U.S. Cl. ........................ 361/697; 361/687; 361/695; 165/121; 174/16.1
(58) Field of Search ................................ 361/687, 689, 361/690–710, 683, 714–722; 165/80.1, 80.2, 80.3, 121, 185, 146, 257, 104.33, 122; 174/16.1, 16.3, 269, 52.3, 252; 257/690–721, 731; 454/184

(56) References Cited

U.S. PATENT DOCUMENTS

| | | | | |
|---|---|---|---|---|
| 6,043,980 A | * | 3/2000 | Katsui | 361/695 |
| 6,181,556 B1 | * | 1/2001 | Allman | 361/690 |
| 6,496,368 B2 | * | 12/2002 | Jui-Yuan | 361/697 |
| 6,646,874 B2 | * | 11/2003 | Pokharna et al. | 361/687 |
| 2003/0194832 A1 | * | 10/2003 | Lopata et al. | 438/108 |

OTHER PUBLICATIONS

USPGPUB 2003/0007327A1, Jan. 9, 2003, Fujiwara.*

* cited by examiner

*Primary Examiner*—Michael Datskovsky
(74) *Attorney, Agent, or Firm*—Timothy J. Keefer; Seyfarth Shaw LLP

(57) ABSTRACT

A heat dissipation device is employed to lower the temperature of an electronic component. The dissipation device has a first blower, a second blower, and three heat dissipation fins. The first heat dissipation fin connected to the electronic component via a heat pipe is cooled by the first blower. The second heat, dissipation fin connected to the electronic component via a heat pipe is cooled by the second blower. The third heat dissipation fin closely connected to the electronic component is cooled by the first and second blower serially.

14 Claims, 4 Drawing Sheets

A-A' Cross Section ated States Patent

HEAT DISSIPATION DEVICE FOR ELECTRONIC COMPONENT

CROSS REFERENCE TO RELATED APPLICATION

This application claims the priority of Taiwanese patent application Serial No. 91136207 filed on Dec. 13, 2002.

BACKGROUND OF THE INVENTION

1. Field of Invention

The present invention relates to a heat dissipation device for an electronic component. More particularly, the present invention relates to a heat dissipation device in a notebook computer.

2. Description of Related Art

Due to the fast development of information technology and computer manufacturing, portable devices (such as notebook computer) and electronic devices are widely used. Portable electronic devices must be light, thin, small, and stylish to meet users' demands. For example, a compact notebook having a superior data processing capacity is popular with many users.

As Integrated circuit manufacturing techniques improve, the layout of an integrated circuit can be very complicated and delicate. For example, users and several applications make demands on high performance Central Processing Unit (CPU), resulting in a more complex layout design for CPUs. Although CPU performance has improved, several new problems consequently arise. One is high power consumption. High power consumption raises the CPU temperature. If the heat dissipation efficiency of the CPU chip cannot be improved, the system is unstable, especially in mobile electronic device.

FIG. 1 illustrates a conventional heat dissipation device for an electronic component. The heat dissipation device is installed near a high power CPU. The heat dissipation fin 14 attached on the CPU chip is cooled by the blower 12. However, this kind of dissipation design is still insufficient for the high power CPU.

SUMMARY OF THE INVENTION

It is therefore an objective of the present invention to provide a highly effective heat dissipation device to increase heat convection between an electronic component and cool air.

It is another an objective of the present invention to provide a serial connection of the blower to increase the volume and speed of the air passing by the heat dissipation fin.

In accordance with the foregoing and other objectives of the present invention, a heat dissipation device is employed to lower the temperature of an electronic component. The dissipation device comprises a first blower, a second blower, and three heat dissipation fins. The first heat dissipation fin, connected to the electronic component via a heat pipe, is cooled by the first blower. The second heat dissipation fin, connected to the electronic component via a heat pipe, is cooled by the second blower. The third heat dissipation fin connected to the electronic component closely is cooled by the first and second blower serially.

According to one preferred embodiment of the present invention, the first blower and the second blower are blowers having a centrifugal force. Both serial connection and parallel connection of the blowers are employed to improve the dissipation efficiency.

According to one preferred embodiment of the present invention, the first blower and the third dissipation fin are positioned on the same horizontal level, and the second blower is positioned lower than the third dissipation fin In conclusion, the parallel connection and serial connection of the blower are employed to remove heat in the heat dissipation fin. Thus, the advantage of the present invention is employing both parallel connection and serial connection to improve heat dissipation efficiency without occupying a larger space.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
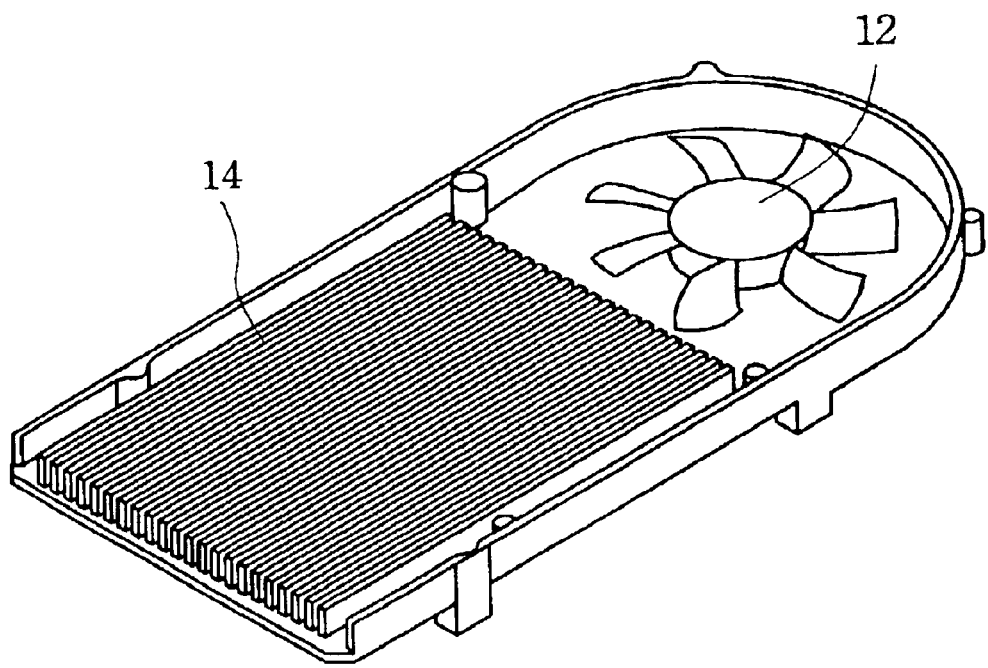
FIG. 1 illustrates a conventional heat dissipation device for an electronic component.

Reference will now be made in detail to the present preferred embodiments of the invention, examples of which are illustrated in the accompanying drawings. Wherever possible, the same reference numbers are used in the drawings and the description to refer to the same or like parts.

Figure 2:
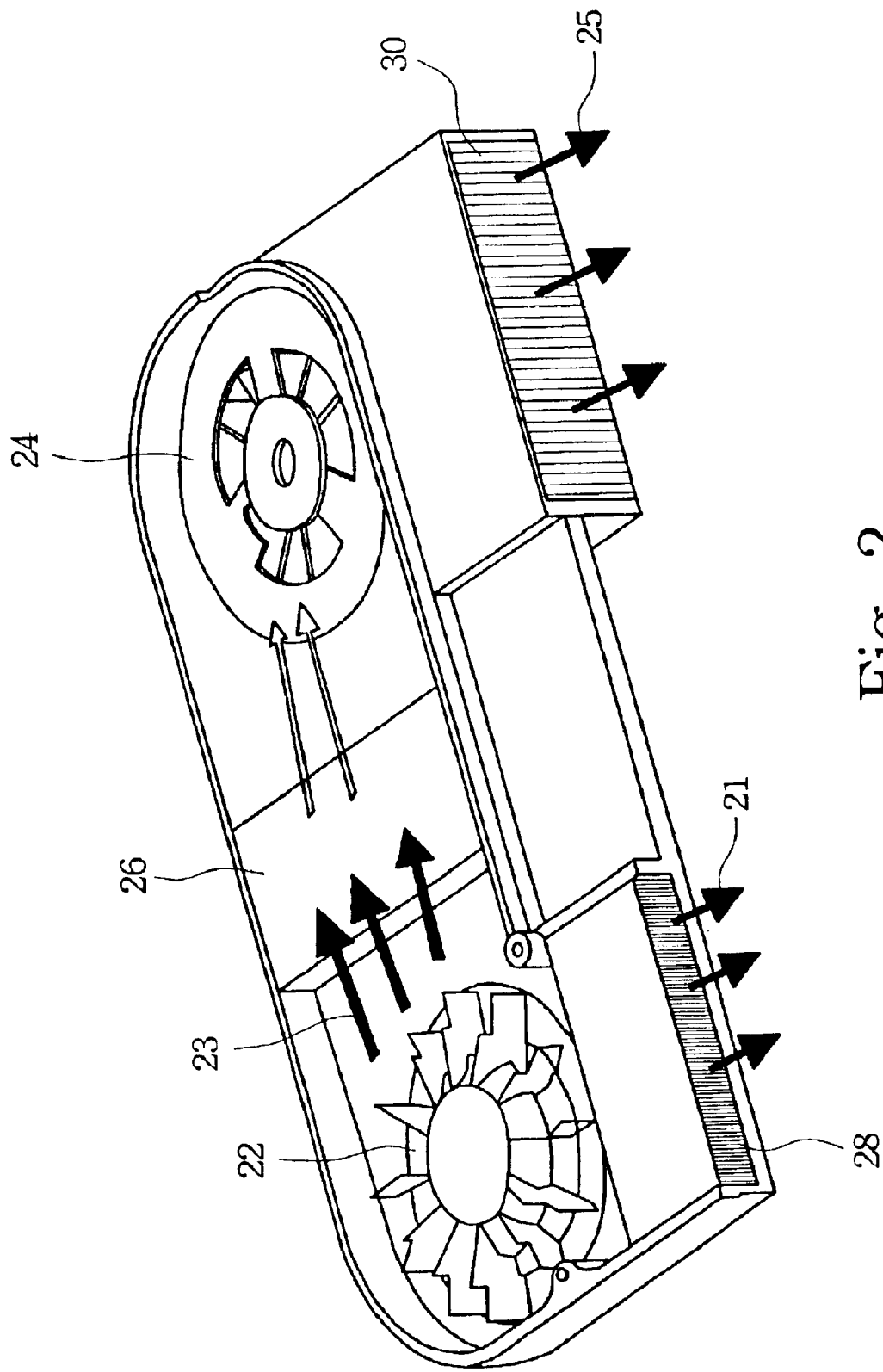
FIG. 2 is a perspective illustration of heat dissipation device according to one preferred embodiment of this invention.

FIG. 2 is a perspective illustration of a heat dissipation device according to one preferred embodiment of this invention. The preferred embodiment of the present invention comprises two blowers and three sets of heat dissipation fins. Two blowers are employed to improve heat dissipation efficiency by both parallel and serial connection without occupying more space. The term "parallel connection" means that heat from a source (such as CPU) is spread out by two blowers simultaneously and independently. For example (referring to FIG. 2), a blower 22 and a blower 24 are respectively employed to remove heat from a heat dissipation fin 28 and a heat dissipation fin 30, both respectively connected to the heat source. Therefore, the convection air in the blower 22 and the heat dissipation fin 28 is independent from that in the blower 24 and the heat dissipation fin 30. "Serial connection" means that heat from a source (such as CPU) is spread out by two blowers simultaneously, but the convection air in the two blowers is mutually interdependent. That is, the pressure and flow rate of the convection air may vary because of two blowers being serially connected. For example (referring to FIG. 2), the convection air passing over the dissipation fin 26 is conducted by the blower 22 and the blower 24. Due to the serial connection of the blower 22 and the blower 24, the efficiency of the dissipation fin 26 can be improved.

Figure 3:
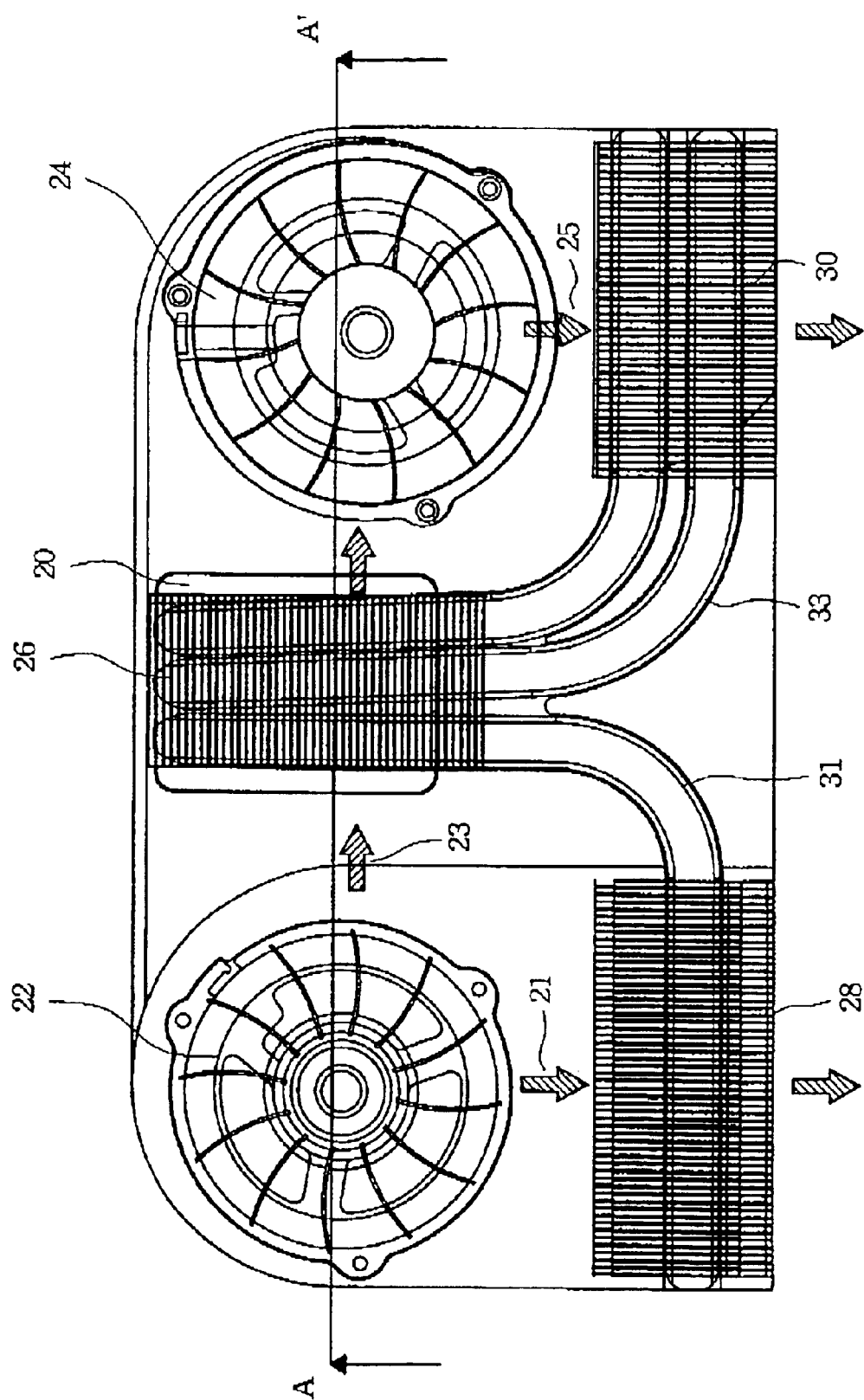
FIG. 3 illustrates a top view of the heat dissipation device according to one preferred embodiment of this invention.

FIG. 3 illustrates a top view of the heat dissipation device according to one preferred embodiment of this invention. There are two blowers (the blower 22 and the blower 24) and three dissipation fins (the dissipation fin 26, the dissipation fin 28, the dissipation fin 30). The dissipation fin 26 is closely attached to an electronic component 20 (i.e. the heat source). Blower 22 has two blowing directions, indicated as a direction 21 at the dissipation fin 28 and a direction 23 at the dissipation fin 26. The blower 24 has only one blowing direction 25. In the preferred embodiments of the present invention, the convection air removes the heat in the heat dissipation fins from the notebook computer in direction 21 and direction 25. The function of a dissipation fin closely attached to a heat source, such as dissipation fin 26, or connected to the heat source via a heat pipe or heat pipes, such as the dissipation fins 28 and 30, is to enlarge the contact area for heat convection. The contact area for heat convection is decided in accordance with the desired dissipation of heat.

Figure 4:
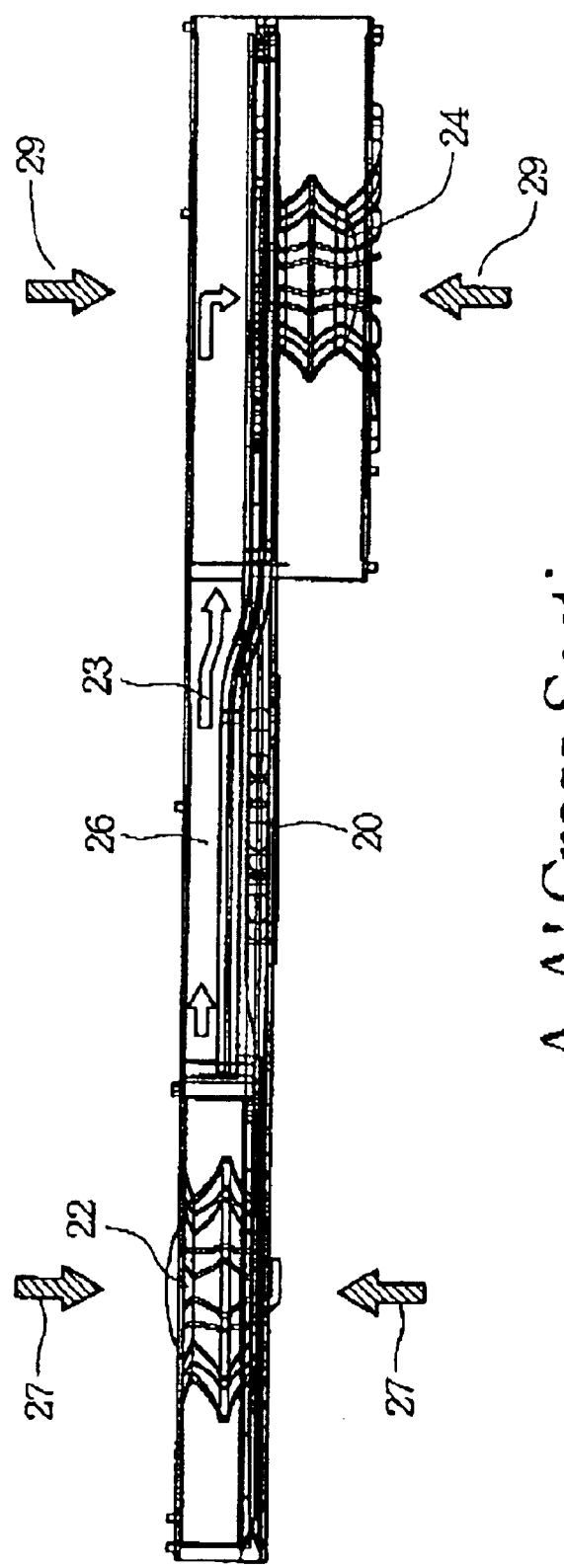
FIG. 4 illustrates a cross-sectional view of the heat dissipation device according to one preferred embodiment of this invention.

FIG. 4 illustrates a cross-sectional view of the heat dissipation device according to one preferred embodiment of this invention. The cross section is taken along line A—A' in FIG. 3. The performance of the heat dissipation fin depends on not only the contact area for heat convection but also the temperature of the convection air passing by. The lower the temperature of the convection air is, the higher the performance of the heat dissipation is. There are several ways to lower the temperature of the convection air passing by the heat dissipation fins. The method employed by the present invention is to increase flow rate and convection air velocity by a two-blower serial connection. For example, with reference to FIG. 4, the convection air passing the dissipation fin 26 is cooled by the blower 22 and the blower 24 serially. In preferred embodiment of the present invention, the blower 22 and the blower 24 are blowers having centrifugal force. That is, the air is introduced from an upper or lower inlet of the blower, and output from a side outlet of the blower. For example, the air is introduced along inlet direction 27 of the blower 22, and output from side outlet of the blower 22. The output convection air passing the heat dissipation fin 26 is introduced by another blower 24 along inlet direction 29. Therefore, the flow rate and speed of the convection air in dissipation fin 26 is increased by the blower 22 and the blower 24 serially.

In order to improve the efficiency of blower serial connection, the layout of the blower position is specially designed. In the preferred embodiment of the present invention, the blower 22 and the dissipation fin 26 fin should be positioned on the same horizontal level, and the blower 24 should be positioned horizontally lower than the dissipation 26. If the positions of the blowers are not appropriate, performance of the serial connection may be sub optimal.

In light of the preferred embodiment, the parallel connection and serial connection of the blower are employed to remove heat from the heat dissipation fin. Thus, the advantage of the present invention is the employment of both the parallel connection and the serial connection to improve heat dissipation efficiency without occupying a larger space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heat dissipation device for an electronic component, said dissipation device comprising:
   a first blower, located on a side of said electronic component;
   a second blower, located on an opposite side of said electronic component;
   a first heat dissipation fin, connected to said electronic component via a heat pipe, wherein said first heat dissipation fin is cooled by said first blower;
   a second heat dissipation fin, connected to said electronic component via said heat pipe, wherein said second heat dissipation fin is cooled by said second blower; and
   a third heat dissipation fin, closely attached to said electronic component which generates heat and is located between said first blower and said second blower, wherein said third heat dissipation fin is cooled by serial connection of said first blower and said second blower.

2. The heat dissipation device of claim 1, wherein said first blower is a centrifugal fan.

3. The heat dissipation device of claim 2, wherein said first blower introduces air from an upper or a lower inlet.

4. The heat dissipation device of claim 2, wherein said first blower inhales air from an upper and a lower inlet simultaneously.

5. The heat dissipation device of claim 1, wherein said second blower is a centrifugal fan.

6. The heat dissipation device of claim 5, wherein said second blower inhales air from an upper or a lower inlet.

7. The heat dissipation device of claim 5, wherein said second blower inhales air from an upper and a lower inlet simultaneously.

8. A heat dissipation device for an electronic component, said heat dissipation device comprising:
   a first centrifugal fan, located on side of said electronic component;
   a second centrifugal fan, located on an opposite side of said electronic component; and
   first heat dissipation fin, closely attached to said electronic component which generates heat and is located between said first blower and said second blower, wherein said first heat dissipation fin is cooled by serial connection of said first blower and second blower, said first and second centrifugal fans are respectively positioned at different horizontal levels with reference to said electronic component.

9. The heat dissipation device of claim 8 further comprising:
   a second heat dissipation fin, connected to said electronic component via a heat pipe, wherein said second heat dissipation fin is cooled by said second blower.

10. The heat dissipation device of claim 8, wherein said first centrifugal fan inhales air from an upper or a lower inlet.

11. The heat dissipation device of claim 8, wherein said first centrifugal fan inhales air from an upper and a lower inlet simultaneously and exhaust the air from a side outlet of the blower.

12. The heat dissipation device of claim 8, wherein said second centrifugal fan introduces air from an upper or a lower inlet.

13. The heat dissipation device of claim 8, wherein said second blower inhales air from an upper and a lower inlet simultaneously, and exhaust the air from a side outlet of the blower.

14. A heat dissipation device for an electronic component, said heat dissipation device comprising:
- a first blower, located on a side of said electronic component;
- a second blower, located on an opposite side of said electronic component;
- a first heat dissipation fin, connected to said electronic component via a heat pipe, wherein said first heat dissipation fin is cooled by said first blower;
- a second heat dissipation fin, connected to said electronic component via said heat pipe, wherein said second heat dissipation fin is cooled by said second blower; and
- a third heat dissipation fin, closely attached to said electronic component, wherein said first blower and said third dissipation fin are positioned on the same horizontal level, and said second blower is positioned lower than said third dissipation fin.

* * * * *